United States Patent
Tseng

(10) Patent No.: US 8,463,328 B1
(45) Date of Patent: Jun. 11, 2013

(54) MOBILE ELECTRONIC DEVICE WRAPPED IN ELECTRONIC DISPLAY

(75) Inventor: Erick Tseng, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/568,730

(22) Filed: Aug. 7, 2012

Related U.S. Application Data

(63) Continuation of application No. 12/629,807, filed on Dec. 2, 2009.

(51) Int. Cl.
*H04W 88/02* (2009.01)

(52) U.S. Cl.
USPC .................................................. 455/566

(58) Field of Classification Search
USPC ... 455/566; 715/710, 723, 767, 835; 345/173, 345/666
See application file for complete search history.

(56) References Cited

U.S. PATENT DOCUMENTS

| | | | |
|---|---|---|---|
| 2006/0026521 A1* | 2/2006 | Hotelling et al. | 715/702 |
| 2006/0087601 A1 | 4/2006 | Lee | |
| 2006/0197456 A1 | 9/2006 | Cok | |
| 2007/0024646 A1* | 2/2007 | Saarinen et al. | 345/660 |
| 2008/0009344 A1* | 1/2008 | Graham et al. | 463/25 |
| 2009/0200938 A2 | 8/2009 | Zhu et al. | |
| 2010/0250801 A1* | 9/2010 | Sangster et al. | 710/73 |
| 2012/0084739 A1* | 4/2012 | Sirpal et al. | 715/863 |
| 2012/0216139 A1* | 8/2012 | Ording et al. | 715/773 |

OTHER PUBLICATIONS

Taub, Eric A., "Panels of Light Fascinate Designers," New York Times [online], Sep. 6, 2009, Retrieved from the Internet, URL: www.nytimes.com/2009/09/07/technology/07bulb.html?_r=1>, retrieved on Dec. 2, 2009, 4 pages.

"Electronic Paper," Wikipedia.com [online], Nov. 29, 2009, Retrieved from the Internet, URL: en.wikipedia.org/wiki/Electronic_paper>, retrieved on Dec. 2, 2009, 10 pages.

"Motorola FONE F3," Wikipedia.com [online], Nov. 7, 2009, Retrieved from the Internet, URL: en.wikipedia.org/wiki/Motorola_FONE_F3>, retrieved on Dec. 2, 2009, 6 pages.

"Samsung Impression Unofficial Fan Site," [online], Retrieved from the Internet, URL: www.samsungimpression.net/>, retrieved on Dec. 2, 2009, 3 pages.

* cited by examiner

*Primary Examiner* — Diane Mizrahi
(74) *Attorney, Agent, or Firm* — Fish & Richardson P.C.

(57) ABSTRACT

Systems and techniques for substantially wrapping a mobile electronic device in a display are provided. A mobile electronic device is described that includes a primary display, a primary user input mechanism, and a secondary display. The primary display is operable to display user-selectable elements and has a face on a portion of an exterior surface of the mobile electronic device. The exterior surface includes all surfaces visible to a user. The primary user input mechanism is operable to receive user selections in coordination with the primary display of user-selectable elements. The secondary display is operable to display content to a user. The secondary display includes substantially the entire exterior surface of the mobile electronic device excluding the primary display.

14 Claims, 9 Drawing Sheets

MOBILE ELECTRONIC DEVICE WRAPPED IN ELECTRONIC DISPLAY

CROSS-REFERENCE TO RELATED APPLICATIONS

This application is a continuation application of and claims priority to U.S. application Ser. No. 12/629,807 filed on Dec. 2, 2009.

TECHNICAL FIELD

This document relates to mobile electronic devices that are wrapped in electronic displays.

BACKGROUND

Mobile communication devices allow users to make telephone calls, receive email, browse the World Wide Web, listen to audio content, and view video content. Users select applications to view content using various user interface mechanisms including, but not limited to, roller balls, keyboards, and touch screen displays. Some mobile communication devices have multiple regions for user input, such as a separate keyboard and numeric keypad. The numeric keypad can be used to input numbers, for example, allowing a user to make telephone calls, while the keyboard allows the user to input text, for example, to send email and text messages and/or browse the World Wide Web.

Users can customize mobile communication devices by changing settings in the mobile communication device. Mobile communication devices include a primary display screen on a portion of the mobile communication device. Content displayed on the primary display screen can be changed by a user. For example, a user can select to display shortcuts on the primary display screen for applications they frequently use. Interface mechanisms, such as roller balls and keyboards allow a user to select from the shortcuts displayed on the primary display screen. Users can program buttons on mobile communication devices to activate different applications. Some mobile communication devices allow users to take pictures which can be sent to other mobile devices or used as wallpaper on the primary display screen of the mobile communication device.

SUMMARY

This document describes systems and techniques for substantially wrapping a mobile electronic device in a display. In general, in one aspect, a mobile electronic device is described that includes a housing and a flexible electronic graphical display. The housing defines a substantially flat front surface, a substantially flat back surface opposed to the front surface and four sides that connect the front surface to the back surface. The flexible electronic graphical display forms an exterior surface of the housing and extends continuously from the front surface to the back surface and across one of the side surfaces, so as to form a U-shaped profile when viewed from an edge of the electronic display. The flexible electronic display has an outer surface from which information that is generated on the display can be seen, that is convex around the one side surface. The flexible electronic display is operable to pan an on-screen entity in a continuous animation from the front surface of the device to the back surface.

Implementations of the mobile electronic device can include one or more of the following features. The flexible electronic display can extend continuously in a band having first and second ends fully around a periphery of the housing. The mobile electronic device can further include a display controller programmed to advance an animation around the periphery of the housing and to roll the animation from the first end to the second end without substantial visual interruption.

The mobile electronic device can further include one or more motion sensors mounted in the housing and connected to cause a display controller to change a manner in which content is displayed on the flexible electronic display in response to sensed motion of the device.

The flexible electronic graphical display can be configured as a touch screen user input mechanism operable to receive user input from substantially the entire flexible electronic display. In some implementations, the flexible electronic graphical display includes a flexible organic light emitting diode (OLED) display and in other implementations, the flexible electronic graphical display includes a flexible electronic ink (e-ink) display.

In general, in another aspect, another mobile electronic device is described including a primary display, a primary user input mechanism, and a secondary display. The primary display is operable to display user-selectable elements and has a face on a portion of an exterior surface of the mobile electronic device, where the exterior surface includes all surfaces visible to a user. The primary user input mechanism is operable to receive user selections in coordination with the primary display of user-selectable elements. The secondary display is operable to display content to a user, where the secondary display includes substantially the entire exterior surface of the mobile electronic device excluding the primary display.

Implementations of the mobile electronic device can include one or more of the following features. The primary user input mechanism can be a touch screen user input mechanism. The mobile electronic device can further include one or more user input controls located on the exterior surface, wherein the secondary display excludes surfaces of the one or more user input controls. The one or more user input controls can include one or more of the following: a button, a keyboard key, a roller ball or a switch. The secondary display can be further operable to display user-selectable elements, and the mobile electronic device can further include a secondary user input mechanism operable to receive user selections in coordination with the secondary display of user-selectable elements.

The secondary user input mechanism can be a touch screen user input mechanism operable to receive user input from substantially the entire secondary display. The secondary user input mechanism can further include one or more touch sensitive user controls located on the exterior surface of the mobile electronic device. The secondary user input mechanism can be operable to automatically activate a telephone application included in the device in response to receiving user input indicating a user is holding the exterior surface of the device in a manner consistent with using the telephone application. The secondary display can be a flexible organic light emitting diode (OLED) wrapped around that portion of the exterior surface of the mobile electronic device forming the secondary display. In another example, the secondary display can be a flexible electronic ink (e-ink) display wrapped around that portion of the exterior surface of the mobile electronic device forming the secondary display.

The content displayed on the primary display can be interactive with content displayed on the secondary display. The primary display and the secondary display can be operable to display content at a first time on the primary display and at a second time on the secondary display, providing for a continuous scrolling of the content around multiple exterior faces of the mobile electronic device.

In general, in another aspect, a computer-implemented method for displaying elements on displays of a computing device is described. User-selectable elements are displayed on a primary display that is located on a portion of an exterior surface of a mobile electronic device. Content is displayed to the user on a secondary display including substantially an entire exterior surface of the mobile electronic device excluding the primary display region.

Implementations of the method can include one or more of the following features. User input can be received through a primary user input mechanism operable to receive user selections in coordination with the primary display of user-selectable elements. User input can be received through a secondary user input mechanism operable to receive user selections in coordination with the secondary display of content, where the content includes user-selectable elements.

The secondary user input mechanism can be a touch sensitive user input mechanism. User input can be received through the secondary user input mechanism indicating the user is holding the mobile electronic device. Based on the user input, the user can be determined to be holding the mobile electronic device in a manner consistent with the user using a telephone application. A telephone application can be automatically activated in response to the determination.

Content can be displayed on the primary display at a first time and on the secondary display at a second time such that the content is displayed continuously scrolling around multiple exterior faces of the mobile electronic device.

In general, in another aspect, another mobile electronic device is described including an exterior surface, being all surfaces visible to a user of the mobile electronic device, a flexible electronic graphical display and a user input mechanism. The flexible electronic graphical display is operable to display user-selectable elements, where the display includes substantially the entire exterior surface of the mobile electronic device. The user input mechanism is operable to receive user selections in coordination with the display of user-selectable elements.

Implementations of the mobile electronic device can include one or more of the following features. The display can include a flexible organic light emitting diode (OLED) wrapped around that portion of the exterior surface of the mobile electronic device forming the display including multiple faces and edges of the mobile electronic device. In other implementations, the display can include a flexible electronic ink (e-ink) display wrapped around that portion of the exterior surface of the mobile electronic device forming the display including multiple faces and edges of the mobile electronic device. The user input mechanism can be a touch sensitive user input mechanism.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

A mobile electronic device is described that has a visual display that is wrapped around substantially the entire exterior surface of the device. That is, the display includes front and back surfaces, as well as edges. The exterior surface of the device can refer to all surfaces that are visible to a user. Therefore, if a device that has slidable components and therefore has more than one "front" and/or "back" surface, the display can include surfaces of the slidable components. In some implementations, the display is operatively divided between a primary display and a secondary display. For example, the primary display can be similar to a conventional display that is found on a mobile electronic device, and the secondary display can be a display that includes substantially the entire exterior surface of the device excluding the primary display.

As used herein, a display is an electronic display that is capable of showing graphical content over a large number of pixels and are controlled in coordination with each other to draw graphical images, and is to be contrasted with simple lights that may be on or off, but do not provide graphical display capabilities.

Figure 1A:
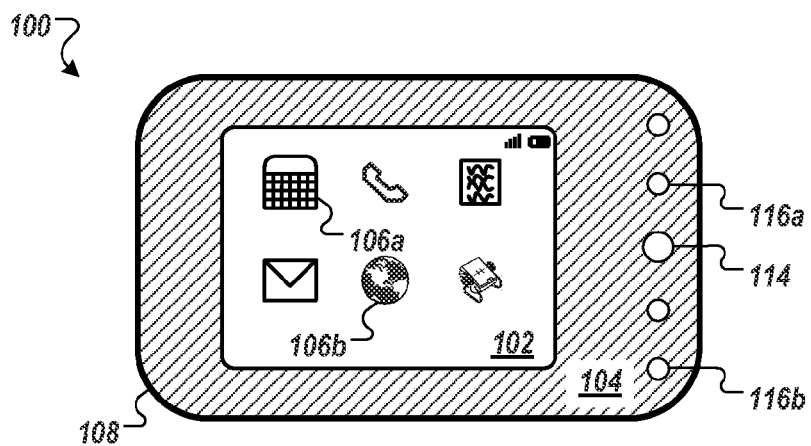
FIG. 1A shows a front side of an example mobile communication device with two displays.
Figure 1B:
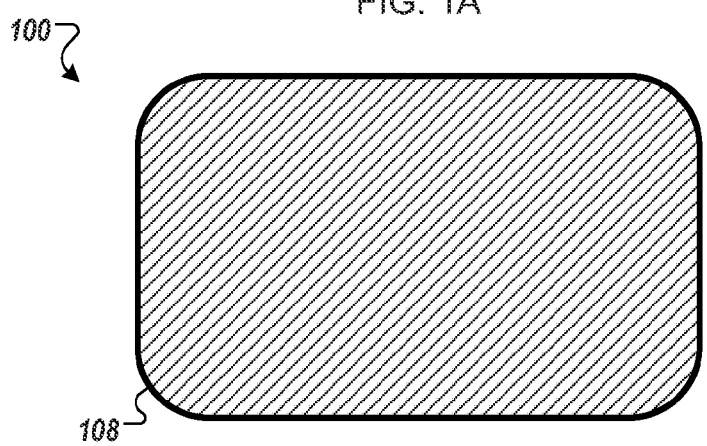
FIG. 1B shows a back side of an example mobile communication device with two displays.
Figure 1C:
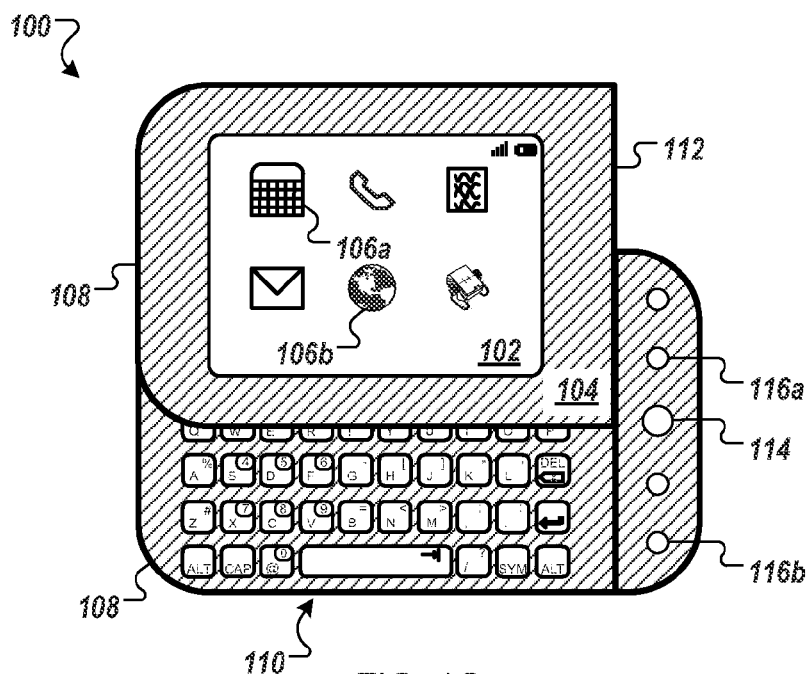
FIG. 1C shows an example of a mobile communication device that slides open and has two displays.

FIGS. 1A-C show one implementation of an example mobile electronic device 100. In this illustrative example, the mobile electronic device is a mobile communication device 100, such as a smartphone. However, it should be understood that features described here can be applied to other types of mobile electronic devices. In the implementation that is shown, the mobile communication device 100 includes a primary display 102 and a secondary display 104. It should be understood that in other implementations, the primary display 102 can make a unitary display by combining it with the secondary display 104.

The primary display 102 can display user-selectable elements 106a-b and has a face on a portion of an exterior surface 108 of the mobile communication device 100. A primary user input mechanism can receive user selections in coordination with the primary display 102 of the user-selectable elements 106a-b, such as on a touch-sensitive surface over the display. The secondary display 104 can display content to a user and can include substantially the entire exterior surface 108 of the mobile communication device 100, excluding the primary display 102. For illustrative purposes, the secondary display 104 is shown in cross-hatch, to highlight how the secondary display 104 includes substantially the entire exterior surface 108 of the mobile communication device 100. The exterior surface 108 of the mobile communication device 100 includes all surfaces visible to a user, such as a front, a back, and all edges of the mobile communication device 100. Other figures that are described below show illustrative examples of content that can be displayed on the secondary display 104.

In some implementations, a user can specify content to be displayed on the secondary display 104. The content can include the current date, time, temperature, and appointments, to name a few examples. In some implementations, a user can interact with content displayed on the secondary display 104. User interaction with the content can include, for example, activating applications on the mobile communication device 100. User interaction can be by one or more types of user interface mechanisms. In some implementations the region of the secondary display 104 can be a touch sensitive region, and user interaction can include touching the secondary display 104.

By way of illustrative example, the primary display 102 can display applications that are running on the mobile communication device 100, with the currently selected application in the foreground. In other implementations, both the primary display 102 and the secondary display 104 present active applications to a user. For example, both the primary display 102 and the secondary display 104 can present the same application to a user at the same time. Software on the device 100 can coordinate the display of graphical items at the boundary between the two displays so that, in certain instances, panning of graphical objects can appear substantially seamless, in that an object can span from one display to the other. In some implementations, the primary display 102 presents one application to a user and the secondary display 104 presents another application to the user. For example, the primary display 102 can display an instant messaging application to a user while the user plays a mobile game presented on the secondary display 104. In other implementations, the primary display 102 and the secondary display 104 present the same application to a user, but the content on the primary display 102 is different than the content on the secondary display 104. For example, the primary display 102 can present a third person view of a mobile golfing application, while the secondary display 104 presents a top down view of the current hole.

FIG. 1A shows a front surface, and FIG. 1B a back surface, of the example mobile communication device 100. In the particular example shown, the mobile communication device 100 includes slidable components. FIG. 1C shows an example of the mobile communication device slid open to give a user access to a keyboard 110. An upper panel 112 of the mobile communication device 100 can slide open to allow access to the keyboard 110. The exterior surface 108 can include all surfaces presented to a user when the upper panel 112 opens, including the keys of the keyboard 110. The secondary display 104 can include the portions of the exterior surface 108 that appear to a user when the upper panel 112 opens, which is illustrated by the cross-hatching on the drawing.

In some implementations, the secondary display 104 does not include fixed features that are part of the exterior surface 108. For example, the secondary display 104 does not include: user input controls such as the keys of the keyboard 110, a roller ball 114 or a switch; the primary display 102; a power connection on the exterior surface 108; or other data connections on the exterior surface 108 of the mobile communication device 100. In some implementations, the secondary display 104 does not include the space between the keys of the keyboard 110. Such areas are functional areas, in that they have functional objects that are used to perform an actual function for the device other than to simply housing the device, or they are areas appurtenant to functional objects that are needed to surround or connect closely-spaced functional objects.

The primary display 102 can include a touch sensitive display that allows user selection of the user-selectable elements 106a-b that are displayed on the primary display 102. In other implementations, the primary display 102 is not touch sensitive, and only displays content to a user. In some implementations, activation of the user-selectable elements 106a-b is facilitated by a roller ball 114, although other types of user interface mechanisms can also be used. In some implementations, the keyboard 110 allows selection of the user-selectable elements 106a-b. In other implementations, selection of the user-selectable elements 106a-b shown on the primary display 102 determines what content is displayed on the secondary display 104. The primary display 102 can display color content to a user. In other implementations, the primary display 102 presents grayscale or black and white content to a user. Also, the primary display 102 may be of a higher resolution than is the secondary display 104, and the position of graphical or textual elements on the two displays may be coordinated so that content may flow smoothly from one display to the other.

In the example mobile communication device 100 shown, user-selectable buttons 116a-b are located on the exterior surface 108. This is but one example of a mobile electronic device 100, and other configurations are possible, which may include more or fewer buttons, or other types of user interface mechanisms.

A display that wraps around substantially an entire exterior surface of a mobile electronic device, whether a single display or multiple displays, e.g., the secondary display 104 of the mobile communication device 100, can be formed using various display technologies. By way of example, and without limitation, in some implementations, the display can be formed from an electronic ink film wrapped around the exterior surface for display of content to a user.

In other implementations, the display can be formed from a flexible organic light emitting diode (OLED) display. Such an OLED display may be produced in a flat format and then bent to match the shape of a device, or may be developed initially in its final, bent form. For example, a foil or flexible plastic substrate may be provided initially in a fabrication process. The substrate may also be part of, or attached to, a portion of a future device housing from the beginning of the process. The substrate may initially be flat or curved into its final shape.

Anodes may then be layered into the substrate in an appropriate orientation relative to the intended orientation and expected bending direction of the display. The anode may take various forms and may be constructed from a material such as Indium-Tin-Oxide (ITO).

A conductive layer or layers and an emissive layer may then be successively grown or deposited onto the device using vacuum deposition, vacuum thermal evaporation (VTE), or organic vapor phase deposition (OVPD), in various known manners. The conductive and emissive layers may be constructed from an appropriate organic molecule or polymer, or mixture of the same.

A barrier layer (e.g., an ultra high barrier layer) may also be provided using "Ultra High Barrier" (UHB) by plasma enhanced chemical vapor deposition.

A clear cathode may then be applied over the conductive and emissive layers. The initial layers may be constructed in a first manner, such as with the substrate flat, and may then be formed into their final shape, or approximate to their final shape, and the cathode may then be added.

In another implementation, the conductive and emissive layers may be applied using inkjet printing. For example, conductive and other flowable inks may be provided to a printhead that may be controlled to position various elements in each of the layers discussed above relative to each other. Proper alignment and indexing between layers may also be obtained via normal techniques.

To maintain a consistent visual impression of graphics across an entire wrapped display, material spacing in an OLED may be varied between flat areas of a display and curved areas of a display. For example, the cathodes and/or anodes that define the resolution and dimensions of the display may have variable spacing. As one example, anodes may be spaced more closely together on curved surfaces of an object, and control of the display for aligning items that are shown on the display may be corrected to handle such inconsistent spacing. Also, the spacing of successive layers moving outward may be varied according to the known future bend angle of the display so that the layers properly align with each other and do not create image artifacts on the bent areas of the display.

The spacing of layers may be computed automatically by uncomplicated geometrical computations. Thus, an OLED manufacturing process may be provided with a CADD or other similar file that define the dimensions of a display and the location, orientation, and size of any portion of the display that will be bent when the display is mounted to a housing. The system may then readily compute the variance in spacing that will be needed for components at each layer of the display to provide for proper spacing of pixels around the bend, and alignment between layers looking out from the bend. Such information may be used to drive the motion of a printhead, for example, when inkjet printed manufacturing technology is used.

As an alternative to wrapping substantially an entire exterior surface of a device, an electronic display like that described above can wrap from a front surface of a device to a back surface that is opposed to the front surface, with the display passing continuously between the surfaces around a side edge of the device. In such an implementation, the display may form a "C" or "U" shape around the device. Also, a display may form a band around a device by covering the front, back, and two sides of the device, in a continuous band. Such implementations may allow for animated scrolling of content from one side of the display to the other in a continuous looking manner. A processor may be programmed to index content across the display to create the scrolling effect, and to "pick up" the content at a first end of the display when it rolls off the second end of the display.

Also, controls in a device may be used to affect what is displayed on each portion of such a wrapping electronic display depending on the orientation of the device or a perceived context of the device. For example, sensors in a device (e.g., accelerometers and/or a compass/magnetometer) may determine what is the top side of the device, and incoming information to the device (e.g., caller ID for an incoming call or the subject line of a recently-received email message) may be displayed on the side of the device that is determine to be facing up. Information could also be displayed initially on the "top" side and then scrolled to the other side of the device. Also, a device may ring with an incoming telephone call and a user may flip the device over to indicate that they are not able to take the call at the moment; subsequently, information about the call may be shown on a display that is on the now-top side of the device or a portion of a display that wraps around the device so that the portion is on the top of the device.

Figure 2A:
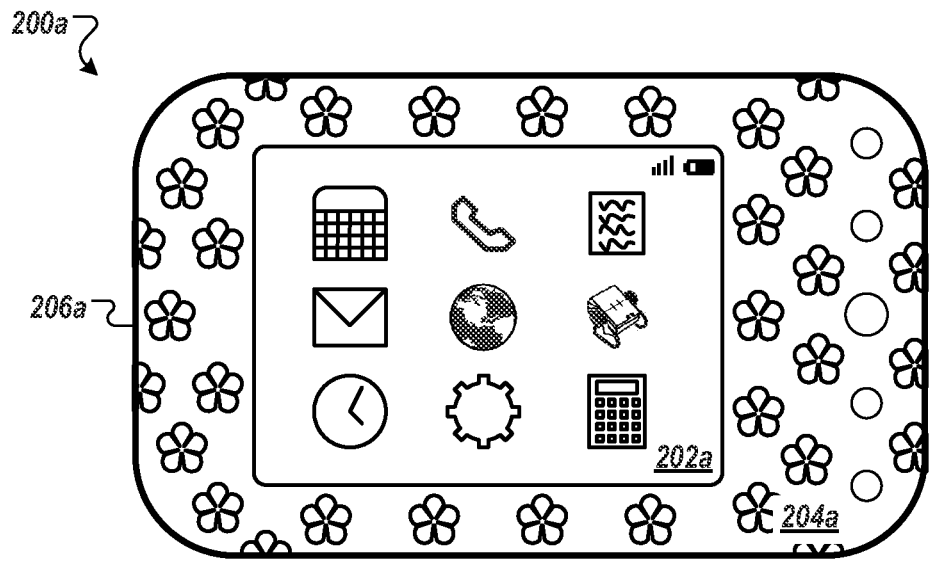
FIG. 2A is an example mobile communication device with a wallpaper shown on a secondary display.
Figure 2B:
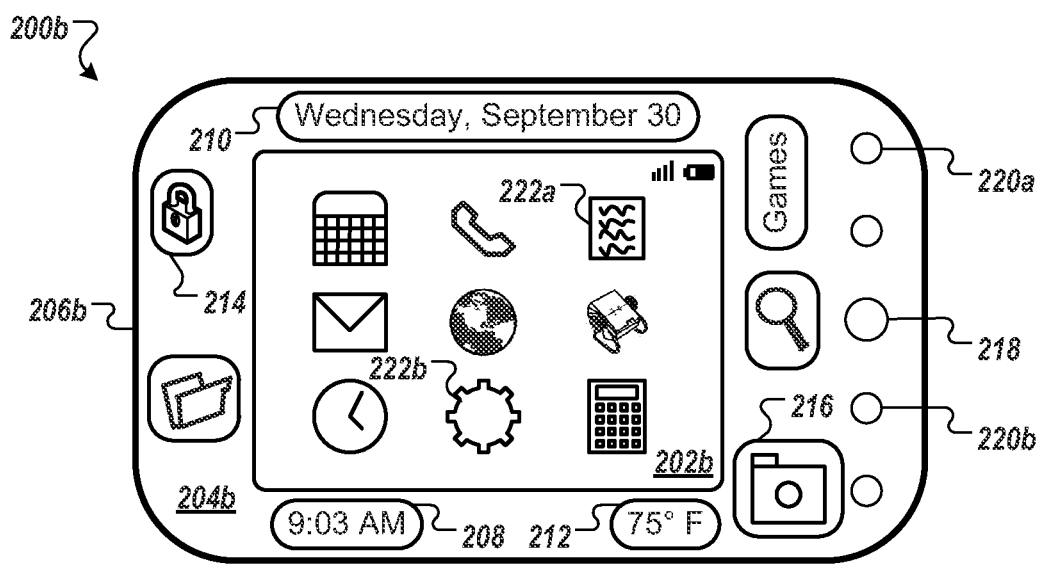
FIG. 2B is an example mobile communication device with interactive content shown on a secondary display.

Referring now to FIGS. 2A and 2B, other examples of mobile communication devices 200a and 200b are shown that include a primary display 202a and 202b and a secondary display 204a and 204b, where the secondary displays 204a and 204b include substantially the entire exterior surface of the devices, excluding the primary displays 202a and 202b respectively. FIG. 2A is an example where the secondary display 204a displays content that is not necessarily user-interactive. By way of illustrative example, in the implementation shown the secondary display 204a is used to display a "wallpaper" design, e.g., to allow a user to customize the look of their mobile communication device 200a. In this example, the user selected the floral motif shown.

In some implementations, a user of the mobile communication device 200a does not interact with the wallpaper shown on the secondary display 204a. The wallpaper presented on the secondary display 204a is static in the sense that it does not change unless a user changes one or more settings on the mobile communication device 200a. Although it should be understood that the wallpaper can be dynamic in the sense that it can constantly or periodically move across the secondary display or otherwise change appearance. For example, the flowers in the floral motif can slowly spin across the secondary display 204a. In some implementations, the wallpaper is displayed seamlessly across both the primary display 202a and the secondary display 204a. Other examples of wallpaper are possible including, without limitation, wallpaper that displays a slideshow of pictures stored on the mobile communication device 200a, or a user selected subset of pictures stored on the mobile communication device 200a, wallpaper that presents a solid color or a pattern to a user, wallpaper that is otherwise user created. In some implementations, when a user selects wallpaper for the mobile communication device 200a, the wallpaper seamlessly covers both the primary display 202a and the secondary display 204a such it appears to a user that there is only one display.

FIG. 2B shows an example where the secondary display 204b is user-interactive. In the implementation of a mobile communication device 200b shown, both the primary display 202b and the secondary display 204b can be used to display user-selectable content. In one implementation, the secondary display 204b is a touch sensitive display that allows users to interact with content displayed on the secondary display 204b by touching the display. Other user interface mechanisms can be used in lieu of, or in addition to, a touch sensitive display. In some implementations, a user can change settings on the mobile communication device 200b in order to determine what content is displayed on the secondary display 204b. In some implementations, a user controls where the content is displayed on the secondary display 204b.

In both mobile communication device 200a and 200b, the secondary displays 204a and 204b include substantially the entire exterior surfaces 206a and 206b respectively, excluding fixed features of the mobile communication devices 200a and 200b that define functional areas. Examples of fixed features include the primary displays 202a and 202b, data ports, electric ports, buttons, roller balls, and the like.

A user can select settings on the mobile communication device 200b to specify user-selectable elements, such as the user-selectable elements 208-216, to display on the secondary display 204b and where the user-selectable elements should be positioned on the secondary display 204b. The mobile communication device 204b presents a user with a predefined list of user-selectable elements to display on the secondary display 204b. In other implementations, a user has the option to choose user-selectable elements from a list or to create a new user-selectable element that will active an application installed on the mobile communication device 200b. The mobile communication device 200b can place the user-selectable elements on the secondary display in a sorted order. For example, the user-selectable elements can be displayed on the secondary display 204b in alphabetic order, or grouped by element type. In other implementations, the user-selectable elements are placed on the secondary display randomly.

A user can place the user-selectable elements on all sides of mobile communication device 200b where the secondary display 204b is located. In some implementations, the user-selectable elements are next to or are covered by fixed features of the mobile communication device 200b, such as the primary display 202b, a roller ball 218, or four user-selectable buttons 220a-b. In some implementations, a user selects the location where the user-selectable elements 208-216 will be placed on the secondary display 204b. The user can touch a portion of the secondary display 204b, and a secondary user input mechanism associated with the secondary display 204b determines where the user touched the secondary display 204b and stores that location as the area to place a user-selectable element. For example, a user configuring the lock element 214 for addition to the secondary display 204b touches a portion of the secondary display 204b to the left of the top left corner of the primary display 202b. The mobile communication device 200b then stores information related to the addition of the lock element 214 on the secondary display 204b, including the location selected by the user.

In some implementations, a secondary user input mechanism associated with the secondary display 204b allows a user to select elements displayed on the secondary display 204b. The secondary display 204b can be a touch sensitive display that allows a user to select elements that are displayed on the secondary display 204b. A secondary user input mechanism can detect a user touching the touch sensitive display, and activate applications on the mobile communication device 200b in response to the user interaction with the secondary display 204b. In some implementations, the secondary display 204b includes user programmable buttons. Icons displayed on the secondary display 204b and associated with the user programmable buttons can change based on the functionality of the user programmable buttons. In other implementations, a user selects the icons for the user programmable buttons. In some implementations, a user selects elements displayed on the secondary display 204b using the roller ball 218. In other implementations, a user selects elements displayed on the secondary display 204b using a keyboard. Other user input mechanisms can be used.

In some implementations, user-selectable elements 222a-b displayed on the primary display 202b allow a user to configure, change, or lock content displayed on the secondary display 204b. The user-selectable elements 222a-b can allow a user to make and receive telephone calls, send and receive electronic messages, or browse the web. In some implementations, the user-selectable elements 222a-b launch applications or bring a hidden application to the foreground.

Selection of the lock element 214 can, for example, prevent accidental activation of an application on the mobile communication device 200b when the entire exterior surface 206b is touch sensitive. For example, the exterior surface 206b includes the touch sensitive primary display 202b and the touch sensitive secondary display 204b. Selection of the lock element 214 can prevent accidental activation of the user-selectable elements 222a-b and the user-selectable content 208-216 displayed on the primary display 202b and the secondary display 204b respectively. For example, accidental activation of the user-selectable content 222a-b and the user-selectable content 208-216 can occur when the mobile communication device 200b is placed in a user's pocket, purse, or baggage and another object presses against or touches the exterior surface 206b. In other implementations, the exterior surface 206b includes one touch sensitive display that is locked by the lock element 214 (e.g., the primary display 202b and the secondary display 204b are one display). In some implementations, selection of the lock element 214 locks the mobile communication device 200b and does not allow a user to use the mobile communication device 200b without entry of a password. For example, a user cannot interact with either the user-selectable elements 222a-b and/or the user-selectable content 208-216. In other implementations, selection of the lock element 214 locks the secondary display 204b and does not allow a user to interact with any user-selectable elements presented on the secondary display 204b until the user-selectable elements presented on the secondary display 204b are unlocked. In some implementations, the primary display 202b and/or the secondary display 204b lock automatically after a user defined period of inactivity has elapsed, e.g., 15 minutes.

In some implementations, selection of a user-selectable element changes the display of both the primary display 202b and the secondary display 204b. For example, if a user activates an application that uses both the primary display 202b and the secondary display 204b, the selected application displays content on both displays. In some implementations, applications run in the background on the mobile communication device 200b such that content related to the applications does not appear on either the primary display 202b or the secondary display 204b. Selection of a user-selectable element displayed on the secondary display 204b related to an application running in the background can change the application to run in the foreground on the mobile communication device 200b, and content related to the application can be displayed on the primary display 202b and/or the secondary display 204b.

The secondary display 204b may, in certain circumstances, wrap all the way around the device 200b, or may simply be applied as an overlay that substantially or fully surrounds a periphery of the primary display 202b.

Referring now to FIGS. 3A-D, another example of one implementation of a mobile communication device 300 is shown that includes a primary display 302 and a secondary display 304. In this example, both the primary display 302 and the secondary display 304 are touch sensitive and allow users to interact with the displays. In other instances, only the primary display 302 might be touch-sensitive, and the secondary display 304 may only provide for the display of content.

In this example, the mobile communication device 300 includes soft buttons, such as a soft button 308 and a soft button 310 that can be user programmable. A soft button refers to a designated region of the touch sensitive exterior of the mobile communication device 300, where touching the designated region sends an instruction to the device 300. For example, in some implementations, the soft button 308 or the soft button 310 can be programmed to adjust the volume of the mobile communication device 300, to mute the mobile communication device 300, or to turn off the power of the mobile communication device 300. In certain implementations, when the mobile communication device 300 is turned off, the soft button 308 and/or the soft button 310 are still powered and can allow the user to turn on the mobile communication device 300, or to launch an application on the mobile communication device the next time the device is turned on.

Figure 3A:
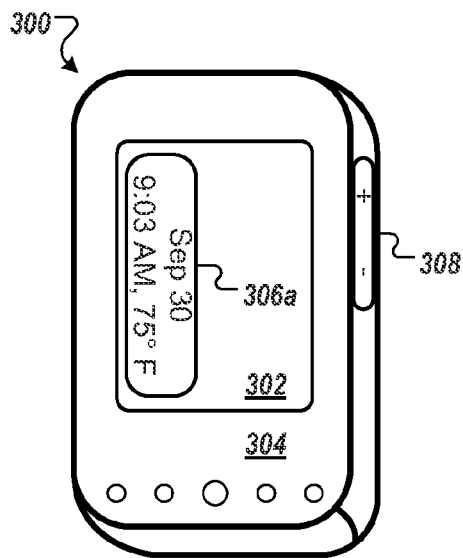
FIGS. 3A-D show an example mobile communication device with two displays and content scrolling between the two displays.
Figure 3B:
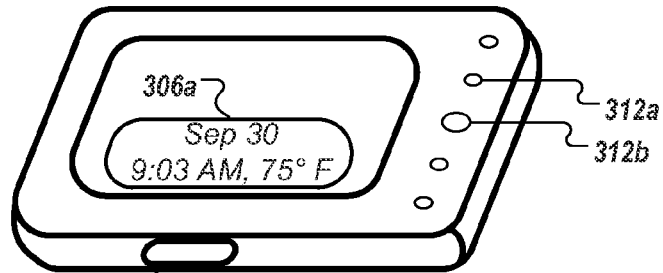
Figure 3C:
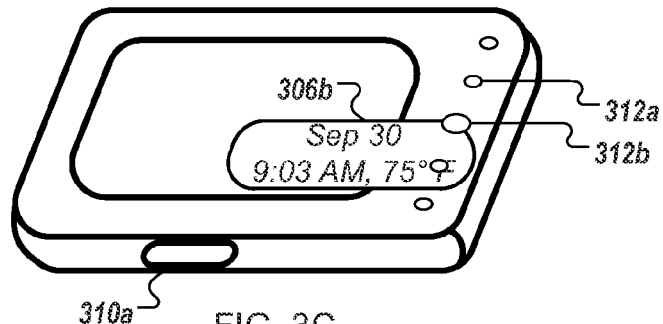
Figure 3D:
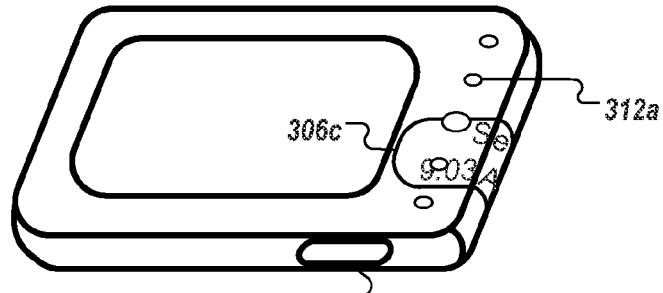

In the example shown, the primary display presents content 306a that can scroll in an animated fashion across the entire exterior surface of the mobile communication device 300 and appear seamlessly to a user of the mobile communication device 300. As shown in FIGS. 3A and 3B, the primary display 302 can display the scrolling content 306a, in this example, to present the date, time, and temperature to a user. As shown in FIG. 3C, the mobile communication device 300 can detect that the content 306a has scrolled past an interface between the primary display 302 and the secondary display 304, and the scrolling content can now be displayed partially on the primary display 302 and partially on the secondary display 304. A display manager on the mobile communication device 300 can display the scrolling content 306b on both the primary display 302 and the secondary display 304. The content 306b can appear seamlessly to a user such that the content 306b appears to be presented on only one display. In FIG. 3D, the content 306b has scrolled around an edge of the secondary display 304. The content can be presented on the primary display 302 and more than one edge or face of the secondary display (e.g., a front face, a side edge, and a back face of the secondary display).

In some implementations, the content 306a-c is displayed only on the secondary display 304. While the content 306a-c is scrolling on the secondary display 304, the display manager can monitor the content 306a-c in order to detect if the content scrolls around an edge of mobile communication device 300 or scrolls onto the primary display 302. The mobile communication device 300 can include one or more fixed features 312a-b. The content 306b-c can, for example, scroll across an area occupied by the fixed features 312a-b such that the content 306b-c is not displayed on the fixed features 312a-b. The fixed features 312a-b can, for example, include hard buttons, data ports, electric ports, roller balls, and the like.

In some implementations, the content 306a displayed on the primary display 302 is user-selectable (i.e., can be selected by a user, e.g., to launch an application by pressing on area on the display 302 that is over the displayed content). In other implementations, the content 306a is not user-selectable and only presents information to a user of the mobile communication device 300. In some implementations, the content 306a is user-selectable on the one display, e.g., the primary display 302, and is not user-selectable on the other display, e.g., the secondary display 304. In certain implementations, a single touch sensitive display includes the primary display 302 and the secondary display 304. For example, the content 306a-c can be presented on a single display to a user of the mobile communication device 300 and scroll around all edges and faces of the single display.

In implementations including a primary display 302 and a secondary display 304, for example mobile communication device 300, the two displays can display in different color modes. For example, when the primary display 302 presents color content to a user, the secondary display 304 can present grayscale content to a user. Scrolling content that spans both the primary display 302 and the secondary display 304 can be partially displayed in color and partially displayed in grayscale. That is, by way of example, the portion of the content on the primary display 302 can be presented in color, while the portion of the content on the secondary display 304 can be presented in grayscale, although the content can otherwise appear seamlessly displayed to a user.

In some implementations, the soft button 308 is programmed to adjust the volume when making or receiving a telephone call, or when playing media on the mobile communication device 300. In other implementations, the soft button 308 is programmed to fast-forward or rewind an audio or video track. Icons displayed above the soft button 308 on the secondary display 304 can be, for example, selected by the mobile communication device 300 based on the functionality of the soft button 308. In other implementations, icons associated with the soft button 308 are selected or designed by a user. In certain implementations, icons associated with the soft button 308 and the functionality of the soft button 308 changes depending on a currently selected application running on the mobile communication device 300. The soft button 310 can, for example, be programmed to mute the microphone of the mobile communication device 300. In some implementations, the location of the soft button 310 is user adjustable, as shown by soft buttons 310a and 310b in FIGS. 3C and 3D respectively. In various implementations, interaction with multiple soft buttons is needed in order to activate an action or to start an application. For example, a user may need to touch the secondary display 304 above both the soft button 308 and the soft button 310 and hold for 3 seconds in order to unlock the mobile communication device 300. In some implementations, the entire touch sensitive surface of the mobile communication device 300 is locked (e.g., non-user interactive) except for the soft buttons 308 and 310, and unlocking the surface, e.g., by pressing both of the soft buttons 308 and 310, allows a user to interact with other content on the mobile communication device 300.

Figure 4:
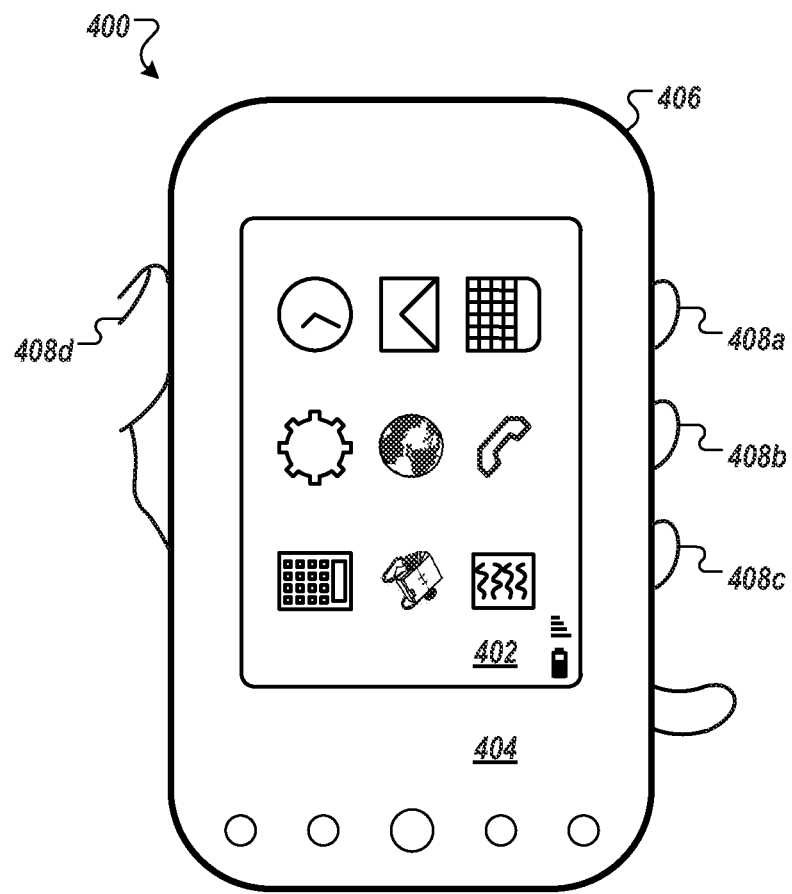
FIG. 4 is an example mobile communication device that has a touch sensitive area being held by a user.

FIG. 4 shows an example mobile communication device 400 that includes a primary display 402, and a secondary display 404. Both the primary display 402 and the secondary display 404 are located on a touch sensitive exterior surface 406 of the mobile communication device 400. In certain implementations, the primary display 402 and the secondary display 404 together form a single display on the exterior surface 406. An input manager in the mobile communication device 400 associated with the exterior surface 406 can detect when a user touches the touch sensitive exterior surface 406 and determine when a user touches "hot spots" on the exterior surface. When the input manager detects user selection of a "hot spot," the mobile communication device 400 can predict an application that the user wishes to use and activate the application.

In some implementations, when there is an incoming call on the mobile communication device 400 and a user touches the mobile communication device 400 on one or more hot spots 408a-d, the input manager determines that the user is going to answer the incoming call. In response, the mobile communication device 400 can automatically answer the incoming call. In certain implementations, the input manager determines that a user's fingers are in a particular orientation instead of, or in addition to, detecting a user touching the hot spots 408a-d. The orientation of a user's fingers can, for example, be used in predicting an application that the user wants to use.

In some implementations, substantially the entire exterior surface 406 of the mobile communication device 400 can be touch sensitive, even if the secondary display 404 is not included. That is, the area show as the secondary display 404 can be just touch sensitive without being a display. In such implementations, an input manager can detect a user touching hot spots, e.g., spots 408a-d, and activate an application in response, similar to as described above in the implementation that included the secondary display 404. Similarly, in such implementations, the mobile communication device 400 can include one or more user programmable soft buttons on the exterior surface of the device 400.

In some implementations, the primary display 402 is not touch sensitive and only hot spots or soft buttons on the balance of the exterior surface 406 are touch sensitive (e.g., the part of the exterior surface 406 that does not include the primary display 402). The input manager of the mobile communication device 400 can detect selection of one of the soft buttons or hot spots and activate the desired application.

Figure 5:
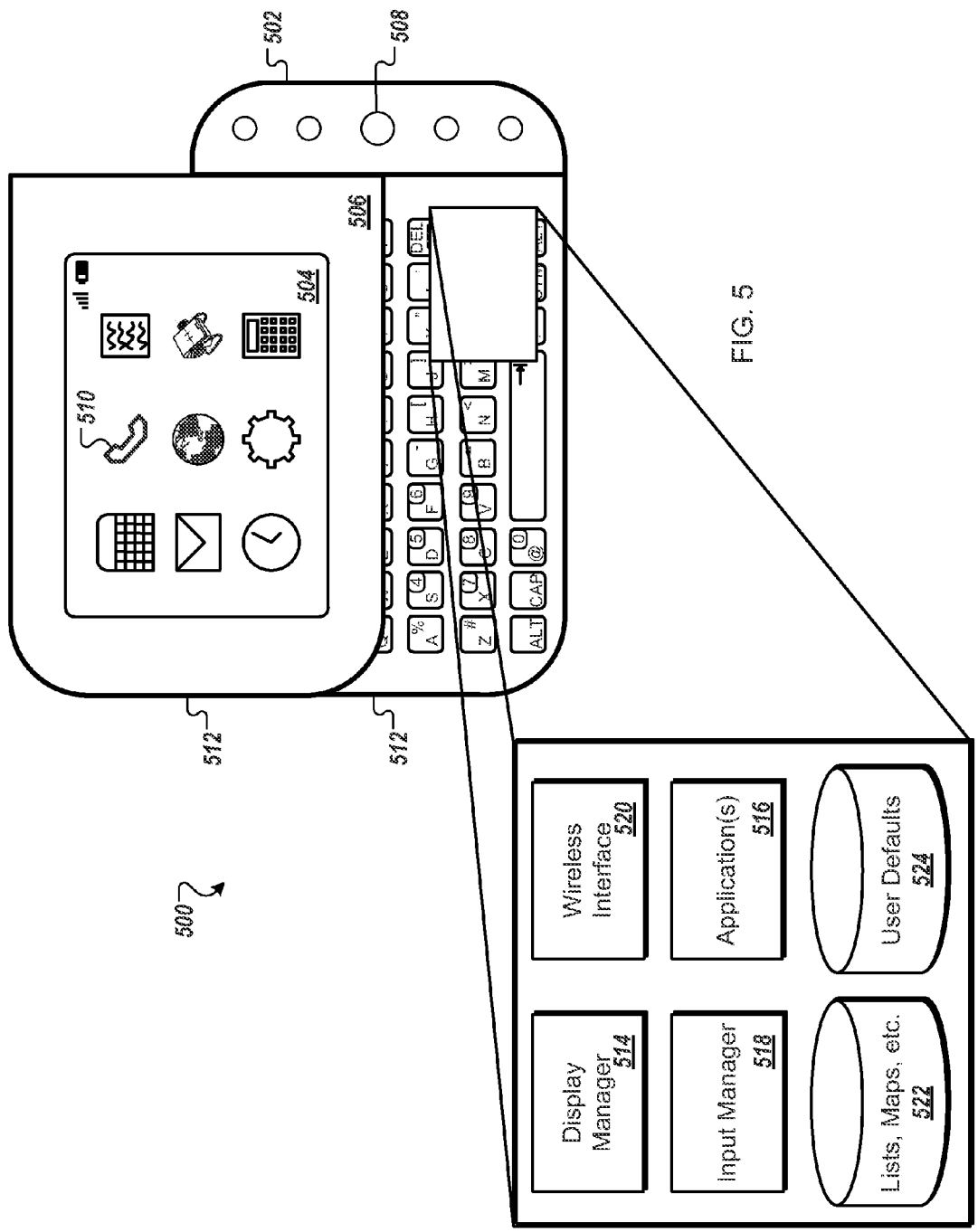
FIG. 5 is a schematic diagram of an example system that provides user interaction in response to touch screen inputs.

FIG. 5 is a schematic diagram of an example system 500 that provides user interaction in response to touch screen inputs. The system 500 can be implemented using a mobile communication device 502. The mobile communication device 502 can include various input and output mechanisms, such as a primary display 504 with a touch screen, a secondary display 506 with a touch screen, and a roller ball 508. A number of components within the device 502 are configured to provide selection of elements displayed on the primary display 504 and the secondary display 506, such as by tapping on a telephone element 510 to open a telephone application. An exterior surface 512 of the mobile communication device 502 includes substantially all surfaces of the mobile communication device 502 visible to a user. The primary display 504 is located on a portion of the exterior surface 512, and the secondary display 506 includes substantially all of the exterior surface 512 excluding all fixed features of the mobile communication device 502 (e.g., the primary display 504 and the roller ball 508).

The system 500 includes a display manager 514, which is operable to render content for presentation on the primary display 504 and the secondary display 506. The display manager 514 can receive graphic-related content from a number of sources and determine how the content is to be presented to a user. For example, when a number of different windows for one or more applications 516 on the mobile communication device 502 need to be displayed, the display manager 514 can determine which of the applications 516 to display, which to hide, and what to display or hide when there is overlap between various graphical objects related to the applications 516. In some implementations, the system 500 includes two display managers, one for the primary display 504 and one for the secondary display 506. In some implementations, the display manager 514 includes various components to provide particular functionality for interacting with displayed elements, which can be shared across multiple applications 516, and can be supplied, for example, by an operating system of mobile communication device 502. For example, volume or mute elements displayed on the primary display 504 or the secondary display 506 can be used across multiple applications 516 on the mobile communication device 502 so that the volume level does not change dramatically when switching between applications 516.

User interaction with the primary display 504 and the secondary display 506 can be managed by an input manager 518. The input manager 518 can coordinate with input mechanisms associated with the primary display 504 and the secondary display 506. For example, the input manager 518 can coordinate with the touch screen displays to determine where a user is in contact with the exterior surface 512 of the mobile communication device 502. The input manager 516 determines if a user has selected an element displayed on either the primary display 504 or the secondary display 506, such as the telephone element 510. In some implementations, the input manager 518 determines if a user is holding the mobile communication device 502 in a particular manner. For example, the input manager 518 determines if a user is holding the mobile communication device 502 in a manner consistent with making or receiving a telephone call. In some implementations, the input manager 518 includes two separate input managers, one for the touch sensitive screen of the primary display 504 and one for the touch sensitive screen of the secondary display 506.

The input manager 518 is responsible for translating commands provided by a user of the mobile communication device 502. For example, such commands can come from a keyboard, from the primary touch screen display 504, from the secondary touch screen display 506, from the trackball 508, or from other such sources, including dedicated buttons or soft buttons (e.g., buttons whose functions may change over time, and whose functions may be displayed on areas of primary display 504 or the secondary display 506 that are adjacent to or on top of the particular buttons). The input manager 518 determines in what area of the display commands are being received, and thus in what application being shown on the display the commands are intended for. In some implementations, the input manager 518 interprets input motions made on both the primary display 504 and the secondary display 506 into a common format and passes those interpreted motions (e.g., short press, long press, flicks, and straight-line drags) to the appropriate application. In some implementations, the input manager 518 reports such inputs to an event manager (not shown) that in turn reports them to the appropriate modules or applications.

A variety of applications 516 can operate, generally on a common microprocessor, on the mobile communication device 502. The applications 516 can take a variety of forms, such as mapping applications, e-mail and other messaging applications, web browser applications, music and video players, and various applications running within a web browser or running extensions of a web browser.

A wireless interface 520 can manage communication with a wireless network, which can be a data network that also carries voice communications. The wireless interface 520 can operate in a familiar manner, such as according to the examples discussed below, and can provide for communication by the mobile communication device 502 with messaging services such as text messaging, e-mail, and telephone voice mail messaging. In addition, the wireless interface 520 can support downloads and uploads of content and computer code over a wireless network.

Various forms of persistent storage can be provided on the mobile communication device 502, such as using fixed disk drives and/or solid state memory devices. Two examples are shown here. First, a lists, maps, etc. storage 522 includes various definitions for objects that may be stored on and presented by the mobile communication device 502. Such objects include lists of other objects, such as lists of songs, television shows, movies, or other media on the device. The lists may also include lists of file names where the mobile communication device 502 stores a large number of files. Also, other objects such as maps may be stored (e.g., as graphical map tiles that can be pre-fetched from a remote server), and metadata about the maps, such as the names of towns and streets on a map, along with the names of points of interest and business on the maps.

Other storage includes user defaults 524, which may be profile information for a user stored on the same media as the lists, maps, etc. 522. The user defaults 524 include various parameters about a user of the mobile communication device 502. For example, the user profile may include data defining elements displayed on the secondary display 506 and the location of those elements on the secondary display 506.

Figure 6:
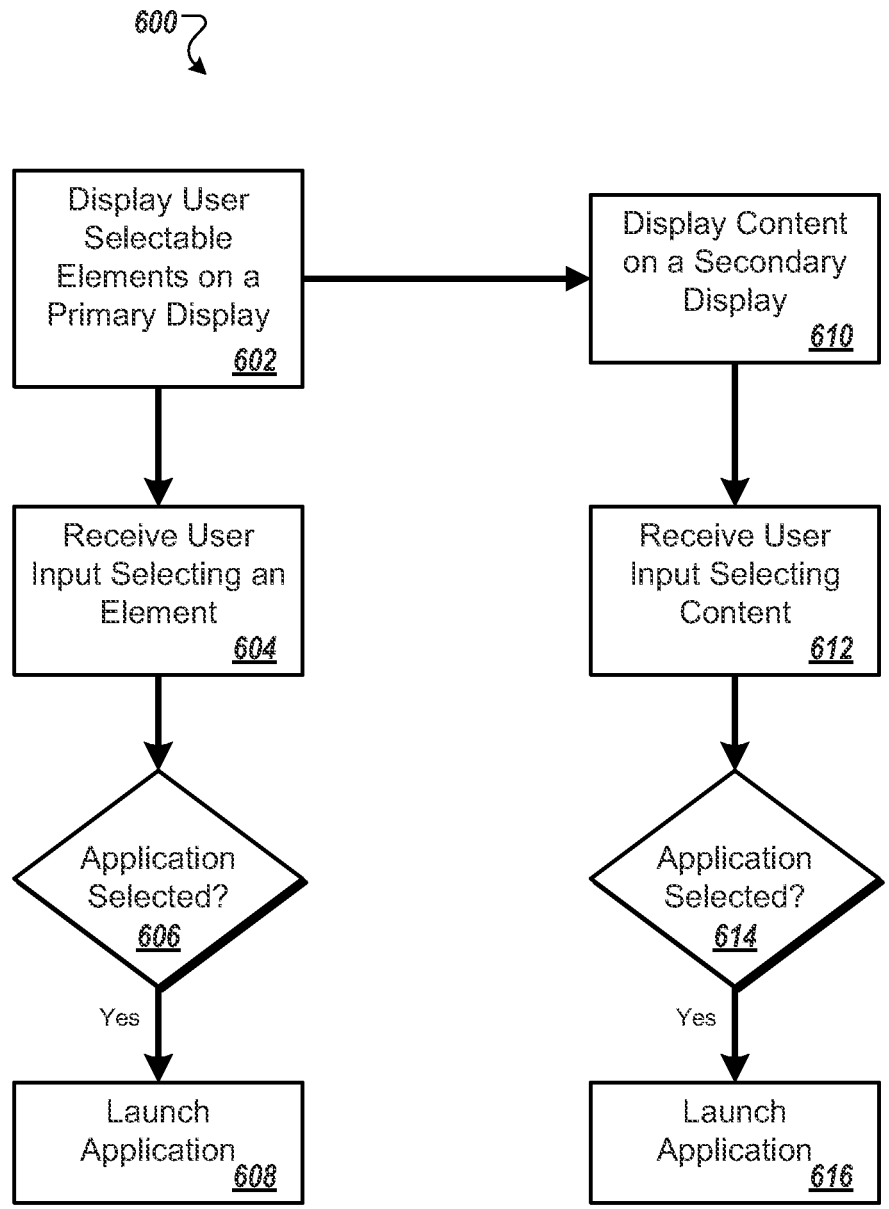
FIG. 6 is a flow chart of an example process for launching an application.

FIG. 6 is a flow chart of an example process 600 for launching an application on a mobile electronic device. The mobile communication device 200b and parts thereof will be referred to in the following as examples. However, it should be understood that the process 600 can be performed by one or more other systems in conjunction with or instead of the mobile communication device 200b. One or more steps of the process 600 can be performed in a different order; as another example, more or fewer steps can be performed. The process 600 can be performed by a processor executing instructions stored in a computer program product.

User-selectable elements are displayed on a primary display (Step 602). For example, the user-selectable elements 222a-b can be displayed on the primary display 202b of the mobile communication device 200b. The user-selectable elements 222a-b can include elements that allow a user to launch an application, elements that allow a user to bring an application to the foreground of the primary display 202b, or elements that allow a user to change settings on the mobile communication device 200b. In some implementations, when a user leaves an application, the application continues to run hidden in the background on the mobile communication device 200b. In other implementations, when a user exits an application the application is closed and is no longer running on the mobile communication device 200b. The user-selectable elements can be displayed in a predetermined order, such as alphabetically, or as otherwise selected by a manufacturer of the mobile communication device 200b. In some implementations, the user-selectable elements are displayed according to preferences stored in the mobile communication device 200b that can be changed by a user of the mobile communication device 200b. For example, a calendar element, an email element, an Internet browsing element, and a contacts element can be displayed on the primary display 202b in locations specified by a user.

User input is received selecting an element displayed on the primary display (Step 604). For example, the primary display 202b can be a touch screen display associated with a primary input mechanism which can receive user selection of one of the user-selectable elements 222a-b displayed on the primary display 202b. When a user touches an element displayed on the primary display 202b with their finger the primary input mechanism can receive the user input. In some implementations, a user selects an element displayed on the primary display 202b by using a roller ball 218 to highlight and then select the element. In other implementations, a user operates a keyboard, such as the keyboard 110 shown in FIG. 1C, in order to select an element displayed on the primary display 202b and the primary input mechanism detects the input from the keyboard. For example, a user can select a calendar element displayed on the primary display 202b. In some implementations, a switch (not shown) or setting associated with the keyboard and/or roller ball determine if the user is selecting an element displayed on the primary display 202b or the secondary display 204b.

If an application was selected by the user input ("Yes" to Step 606), then the application can be launched (Step 608). For example, the primary input mechanism can use the user input to determine if one of the user-selectable elements 222a-b was selected by a user. If the user selected one of the user-selectable elements 222a-b, the process can proceed to step 608. If the user did not select one of the user-selectable elements 222a-b, the process 600 can end. For example, if a user swipes a finger across the primary display 202b and touches more than one of the user-selectable elements 222a-b, the process 600 can end. In some implementations, if a user selects more than one of the user-selectable elements 222a-b but the primary input mechanism determines that one of the user-selectable elements 222a-b was the main focus of the user selection, the primary input mechanism determines the application associated with the user selected element that was the main focus of the selection. For example, if a user touches a calendar element and an email element displayed on the primary display 202b and most of the user contact on the primary display 202b is associated with the calendar element, the primary input mechanism can determine that the calendar element was selected and identify the application associated with the calendar element.

The application identified as selected, e.g., by the primary input mechanism, can be launched on the mobile communication device 200b. In some implementations, if the application identified by the primary input mechanism is running hidden in the background on the mobile communication device 200b, the application is brought to the foreground and displayed on the primary display 202b. In some implementations, when the application identified by the primary input mechanism is identified as needing to run on the secondary display 204b (e.g., by setting stored on the mobile communication device 200b), the application is launched and displayed on the secondary display 204b. In some implementations, the application selected by a user changes a setting on the mobile communication device 200b. For example, a wallpaper displayed on the secondary display 204b can change. As another example, elements displayed on the secondary display 204b can change, such as when a user is switching from a work profile to a personal profile. The work profile can display user-selectable and non-selectable elements, such as calendar elements, to-do elements, and contact elements, on the secondary display related to the tasks a user does while at work. The personal profile can display elements related to activities a user participates in during their personal time, such as personal email, instant messaging, and browsing the World Wide Web. In other implementations, the personal profile displays a wallpaper on the secondary display 204b that is not user interactive.

In an implementation including both a primary and a secondary display, content can be displayed on the secondary display (Step 610). For example, the user-selectable content 208-216 can be displayed on the secondary display 204b. The user-selectable content 208-216 can allow a user to activate an application, change settings on the mobile communication device 200b, or lock one or more touch screen displays of the mobile communication device 200b, to name a few examples. Content displayed on the secondary display can include identification of soft buttons and/or hot spots for activation or launching of user selected applications or prediction of user actions.

In implementations where the content displayed on the secondary display is user-interactive, user input selecting content can be received (Step 612). For example, a user can select the lock camera element 216. User selection of content can be detected by a secondary input mechanism associated with the secondary display. User selection of content displayed on the secondary display can be, for example, touching a portion of a touch screen display associated with the content, selection of content with a roller ball, or use of a keyboard to select a keyboard shortcut associated with the content. The secondary input mechanism can, for example, determine what content presented on the secondary display was selected. In some implementations, a setting or a switch (not shown) associated with the keyboard allows a user to interact with content displayed on the secondary display 204b instead of content displayed on the primary display 202b. For example, the switch can have a "primary display" setting and a "secondary display" setting that determines which display corresponds to a user input.

If the user input selected an application ("Yes" for Step 614), then the application can be launched (Step 616). For example, the secondary input mechanism can determine if the content that was selected is associated with an application. If the content selected is not associated with an application was not selected, such as the lock content 214, the mobile communication device 200*b* can take the appropriate actions, such as locking the mobile communication device 200*b*. If the secondary input mechanism determines that there is an application associated with the selected content, such as the camera content 216, the secondary input mechanism can identify the application.

Figure 7:
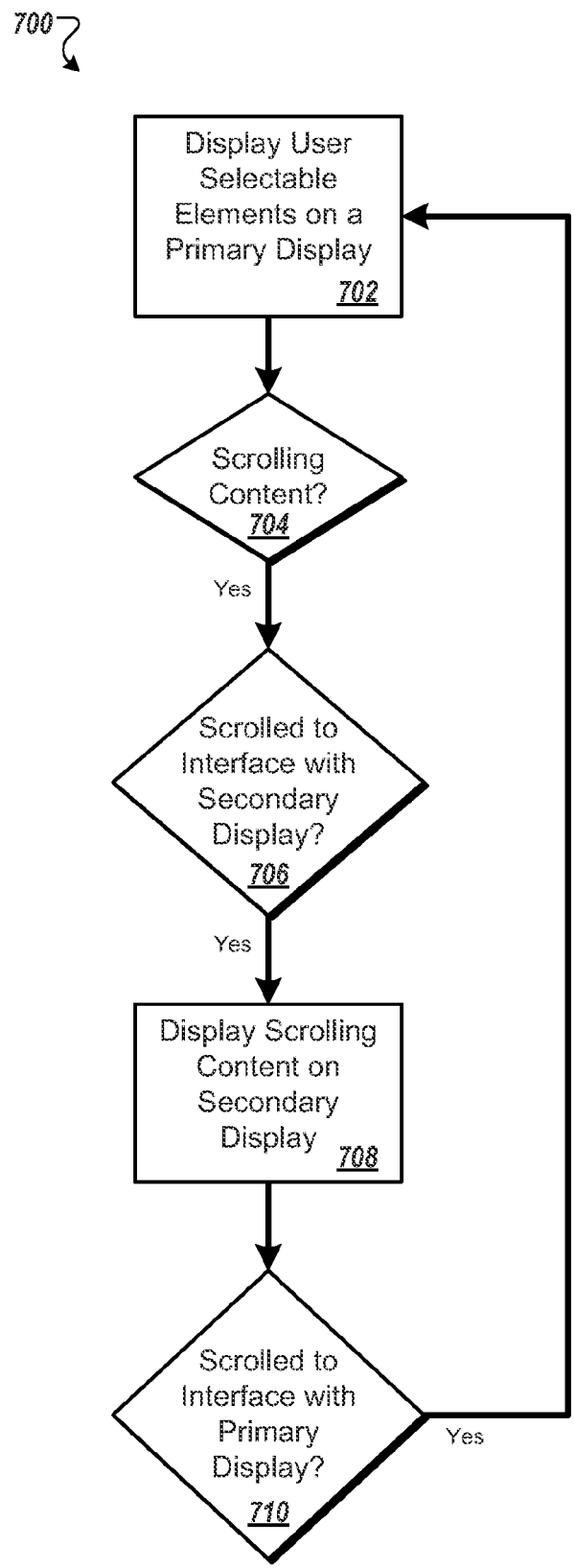
FIG. 7 is a flow chart of an example process for content scrolling between two displays.

FIG. 7 is a flow chart of an example process 700 for displaying scrolling content on a mobile electronic device. The mobile communication device 300 and parts thereof will be referred to in the following as examples. However, it should be understood that the process 700 can be performed by one or more other systems in conjunction with, or instead of, the mobile communication device 300. One or more steps of the process 700 can be performed in a different order; as another example, more or fewer steps can be performed. The process 700 can be performed by a processor executing instructions stored in a computer program product.

User-selectable elements are displayed on a primary display (Step 702). For example, content 306*a* is displayed on the primary display 302 of the mobile communication device 300. The user-selectable elements can present information to a user of the mobile communication device 300, allow the user to launch applications on the mobile communication device 300, or allow the user to change settings, to name a few examples. In some implementations, step 702 displays elements that are not user-selectable or that are only user-selectable when displayed on the primary display 302.

If the elements displayed on the primary display include scrolling content ("Yes" for Step 704), the process proceeds to step 706. For example, the mobile communication device 300 can determine if the content 306*a* does not move on the primary display 302, or if the content can scroll across the primary display 302. In some implementations, the content 306*a* scrolls across both the primary display 302 and the secondary display 304. In other implementations, the content 306*a* scrolls across only the primary display 302. If the content 306*a* is stationary, the process 700 can end.

If the scrolling content has scrolled to interface between the primary display and a secondary display ("Yes" for Step 706), then the scrolling content can next be displayed in whole, or in part, on the secondary display (Step 708). For example, a display manager on the mobile communication device 300 can determine if the content 306*a* has scrolled to an interface of the primary display 302 and secondary display 304. The display manager can determine if the content 306*a* should be presented on the secondary display 304 or if the content 306*a* should only be presented on the primary display 302. If the content 306*a* can only be displayed on the primary display 302, the process 700 can end.

Scrolling content that is intended to scroll around the entire exterior surface of the device can be presented, e.g., by the display manager of the mobile communication device 300, on both the primary display and the secondary display 304. The content 306*b* can be presented in a way to appear seamless to a user of the mobile communication device 300. In some implementations, the content 306*b* scrolls across one or more edges of the secondary display 304. In certain implementations, the content 306*b* can move completely off of the primary display 302 and is only presented to a user on the secondary display 304. In some implementations, the secondary display 304 is not touch sensitive and a user cannot interact with the content 306*b* while it is displayed on the secondary display 304. In other implementations, the content 306*b* is not user interactive. For example, the content 306*b* can include a slideshow of images stored on the mobile communication device 300 or a scrolling wallpaper (e.g., with a floral motif as shown in FIG. 2B).

If the scrolling content being presented on the secondary display has scrolled to an interface with the primary display ("Yes" for Step 710), then the scrolling content can be presented in whole, or in part, on the primary display, and the process can loop back to Step 702.

Figure 8:
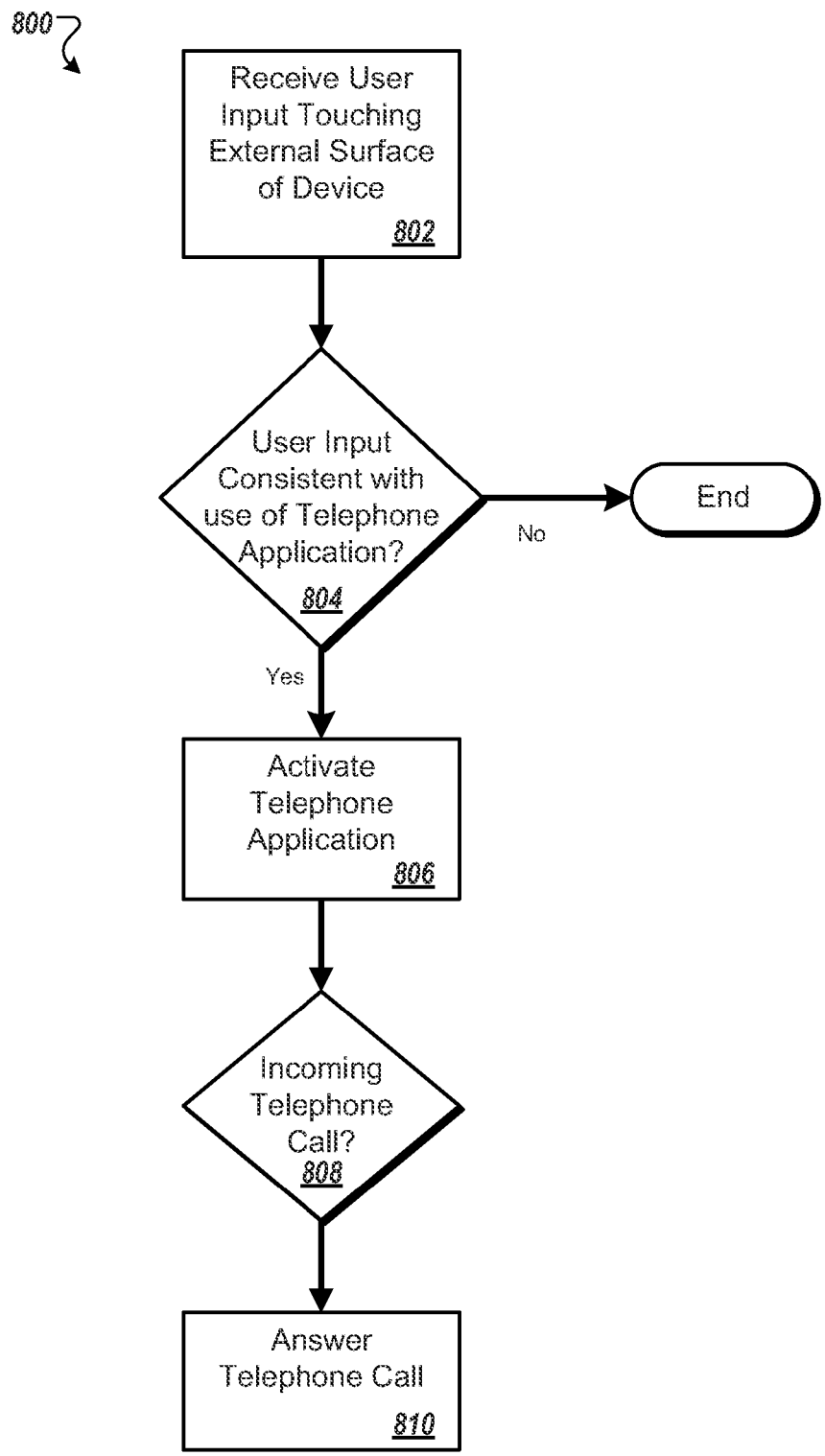
FIG. 8 is a flow chart of an example process for activating an application.

FIG. 8 is a flow chart of an example process 800 for activating an application on a mobile electronic device. The mobile communication device 400 and parts thereof will be referred to in the following as examples. However, it should be understood that the process 800 can be performed by one or more other systems in conjunction with or instead of the mobile communication device 400. One or more steps of the process 800 can be performed in a different order; as another example, more or fewer steps can be performed. The process 800 can be performed by a processor executing instructions stored in a computer program product.

User input touching an external surface of a device is received (Step 802). For example, a user touches the external surface 406 of the mobile communication device 400 with one or both hands. In a particular example, the user touches the mobile communication device 400 with their left hand touching the hot spots 408*a-d*. An input manager associated with the exterior surface 406 of the mobile communication device 400 receives the user input from the touch sensitive surface of the exterior surface 406. In some implementations, the entire exterior surface 406 is a single touch sensitive display. In other implementations, the exterior surface 406 includes a touch sensitive surface and the mobile communication device 400 only includes the primary display 402 (and does not include the secondary display 404). In certain implementations, one or more portions of the exterior surface 406 are touch sensitive and the rest of the exterior surface 406 is not touch sensitive.

If the user input is determined to be consistent with use of a telephone application ("Yes" branch of Step 804), then the telephone application can be activated (Step 806). For example, the input manager can determine if a user is touching all of the hot spots 408*a-d*. In some implementations, the input manager determines if a user is touching the exterior surface 406 in locations other than the hot spots 408*a-d*. If the input manager determines that either not all of the hot spots 408*a-d* are selected by a user, or that the user is touching a location other than the hot spots 408*a-d*, the process 800 can end. If the input manager determines that a user is touching all of the hot spots 408*a-d* firmly and is lightly touching one or more other surface of the exterior surface 406, the input manager can determine that the user is holding the mobile communication device 400 consistent with making a call. In some implementations, a user can program finger orientations into the mobile communication device 400 for identification of finger positions consistent with using a telephone application.

If the input manager determines that only the hot spots 408*a-d* are selected, or that a user is otherwise holding the mobile communication device 400 consistent with making a telephone call, the input manager can send a notification to the mobile communication device 400. The notification can include, for example, information telling the mobile communication device 400 that a user is holding the mobile communication device 400 consistent with a telephone application. In some implementations, if there is more than one telephone application on the mobile communication device 400, the notification can include information about a specific telephone application a user would like to launch. In response, the mobile communication device 400 can launch or activate the specific telephone application associated with the position of a user's fingers holding the mobile communication device 400. In some implementations, activation of the telephone application dials a predetermined phone number that a user programmed as a setting in the mobile communication device 400.

If there is a determination that there is an incoming telephone call to the mobile communication device ("Yes" branch of Step 808), then the telephone application can be launched or activated to automatically answer the incoming call (Step 810). In some implementations, the mobile communication device 400 determines that the mobile communication device 400 is held close to a user's head before answering an incoming call. For example, a sensor on the mobile communication device 400 can detect an object within about 1 to about 2 inches from the primary display 402 and predicts that the object is the user's head.

Figure 9:
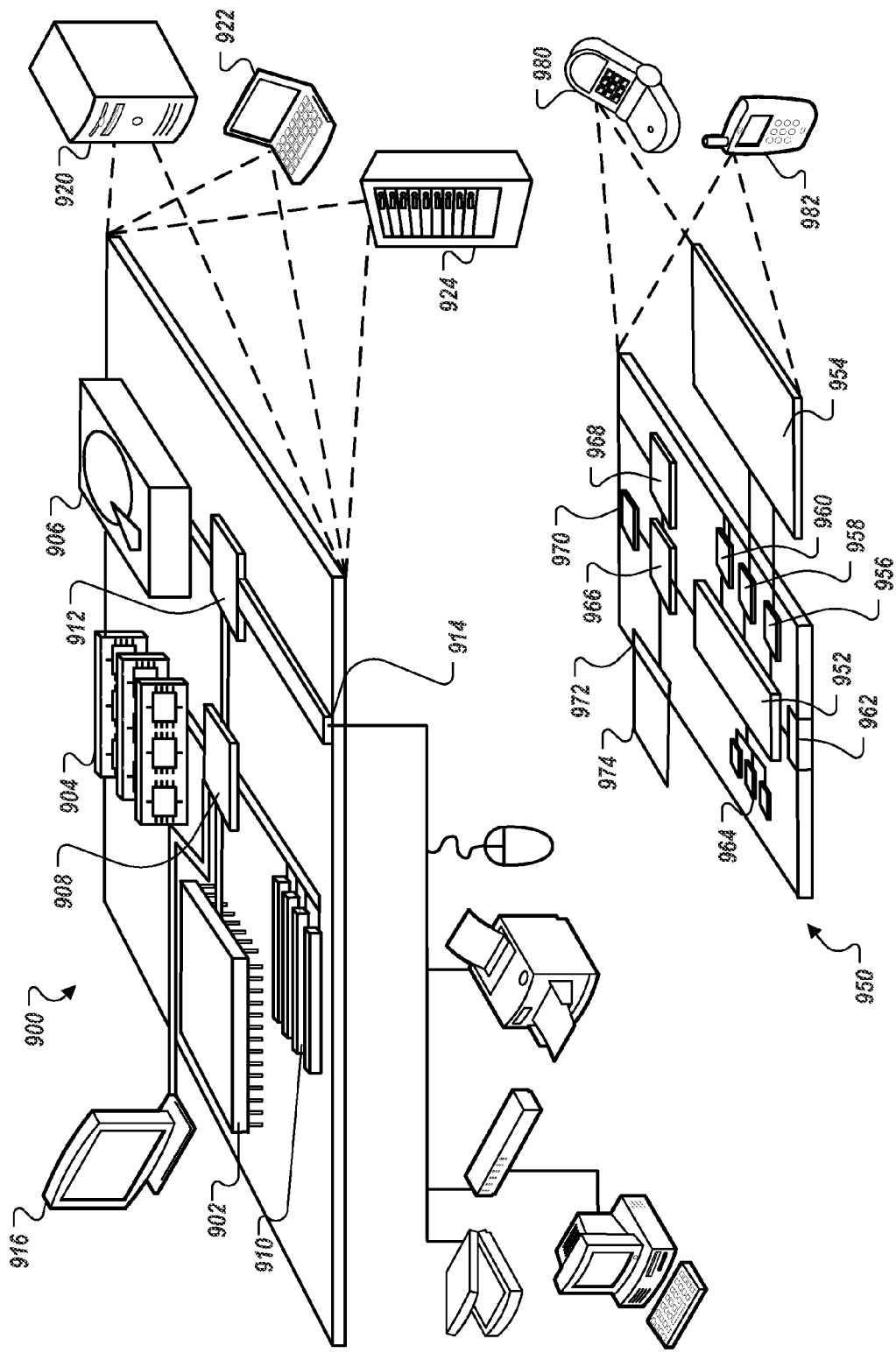
FIG. 9 shows examples of generic computer devices that may be used to execute the actions discussed in this document.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various buses, and may be mounted on a common motherboard or in other manners as appropriate. The processor 902 may process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer-readable or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 may execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display), an OLED (Organic Light Emitting Diode) display, or an electronic ink display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 may be implemented as one or more of a computer-readable medium or media, a volatile memory unit or units, or a non-volatile memory unit or units. Expansion memory 974 may also be provided and connected to device 950 through expansion interface 972, which may include, for instance, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Device 950 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 950 and used to update the display of the respective devices 950 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A mobile electronic device comprising:
a primary display operable to display user-selectable elements and has a face on a portion of an exterior surface of the mobile electronic device, the exterior surface comprising all surfaces visible to a user;
a primary user input mechanism operable to receive user selections in coordination with the primary display of user-selectable elements; and
a secondary display operable to display content to a user, where the secondary display comprises substantially the entire exterior surface of the mobile electronic device excluding the primary display, where the secondary display comprises one of a flexible organic light emitting diode (OLED) display wrapped around that portion of the exterior surface of the mobile electronic device comprising the secondary display and a flexible electronic ink (e-ink) display wrapped around that portion of the exterior surface of the mobile electronic device comprising the secondary display.

2. The mobile electronic device of claim 1, further comprising:
one or more user input controls located on the exterior surface;
wherein the secondary display excludes surfaces of the one or more user input controls.

3. The mobile electronic device of claim 1, where the one or more user input controls include one or more of the following: a button, a keyboard key, a roller ball or a switch.

4. The mobile electronic device of claim 1, where the secondary display is further operable to display user-selectable elements, the device further comprising:
a secondary user input mechanism operable to receive user selections in coordination with the secondary display of user-selectable elements.

5. The mobile electronic device of claim 4, wherein the secondary user input mechanism comprises a touch screen user input mechanism operable to receive user input from substantially the entire secondary display.

6. The mobile electronic device of claim 5, wherein the primary user input mechanism comprises a touch screen user input mechanism.

7. The mobile electronic device of claim 5, where the secondary user input mechanism further includes one or more touch sensitive user controls located on the exterior surface of the mobile electronic device.

8. The mobile electronic device of claim 1, where the secondary user input mechanism is operable to automatically activate a telephone application included in the device in response to receiving user input indicating a user is holding the exterior surface of the device in a manner consistent with using the telephone application.

9. The mobile electronic device of claim 1, where content displayed on the primary display is interactive with content displayed on the secondary display.

10. A mobile electronic device comprising:
a primary display operable to display user-selectable elements and has a face on a portion of an exterior surface of the mobile electronic device, the exterior surface comprising all surfaces visible to a user;
a primary user input mechanism operable to receive user selections in coordination with the primary display of user-selectable elements; and
a secondary display operable to display content to a user, where the secondary display comprises substantially the entire exterior surface of the mobile electronic device excluding the primary display, where the primary display and the secondary display are operable to display content at a first time on the primary display and at a second time on the secondary display providing for a continuous scrolling of the content around multiple exterior faces of the mobile electronic device.

11. A method comprising:
displaying, on a primary display, user-selectable elements, wherein the primary display has a face on a portion of an exterior surface of a mobile electronic device, the exterior surface comprising all surfaces visible to a user;
receiving, on a primary user input mechanism, user selections in coordination with displaying user-selectable elements on the primary display; and
displaying, on a secondary display, content to a user, where the secondary display comprises substantially the entire exterior surface of the mobile electronic device excluding the primary display, wherein the secondary display comprises a flexible organic light emitting diode (OLED) display wrapped around that portion of the exterior surface of the mobile electronic device comprising the secondary display.

12. The method of claim 11, further comprising:
displaying, on the secondary display, user-selectable elements; and
receiving, on a secondary user input mechanism, user selections in coordination with displaying user-selectable elements on the secondary display.

13. The method of claim 12, wherein the secondary user input mechanism comprises a touch screen user input mechanism operable to receive user input from substantially the entire secondary display.

14. The method of claim 13, further comprising:
automatically activating a telephone application included in the mobile electronic device in response to receiving user input indicating a user is holding the exterior surface of the device in a manner consistent with using the telephone application.

* * * * *